(12) United States Patent
Schmidt

(10) Patent No.: US 9,640,182 B2
(45) Date of Patent: May 2, 2017

(54) SYSTEMS AND VEHICLES THAT PROVIDE SPEECH RECOGNITION SYSTEM NOTIFICATIONS

(71) Applicant: Toyota Motor Engineering & Manufacturing North America, Inc., Erlanger, KY (US)

(72) Inventor: Eric Randell Schmidt, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 419 days.

(21) Appl. No.: 13/932,322

(22) Filed: Jul. 1, 2013

(65) Prior Publication Data

US 2015/0006166 A1    Jan. 1, 2015

(51) Int. Cl.
*G10L 15/22* (2006.01)
*G10L 15/30* (2013.01)

(52) U.S. Cl.
CPC .................................. *G10L 15/30* (2013.01)

(58) Field of Classification Search
CPC ....... G10L 15/22; G10L 15/222; G10L 15/30; G10L 15/32
USPC ............. 704/235, 236, 270, 270.1, 275, 276
See application file for complete search history.

(56) References Cited

U.S. PATENT DOCUMENTS

| | | |
|---|---|---|
| 5,819,225 A | 10/1998 | Eastwood et al. |
| 5,864,815 A | 1/1999 | Rozak et al. |
| 6,192,339 B1 * | 2/2001 | Cox .......................... G10L 15/30 704/270 |
| 6,282,268 B1 * | 8/2001 | Hughes .................. H04M 3/493 704/260 |
| 6,408,272 B1 * | 6/2002 | White ...................... G10L 15/30 704/270.1 |
| 6,418,216 B1 * | 7/2002 | Harrison .................. H04M 3/20 379/205.01 |
| 6,621,800 B1 * | 9/2003 | Klein ...................... H04M 3/533 370/282 |
| 6,882,973 B1 * | 4/2005 | Pickering .............. G10L 15/222 704/270 |
| 7,047,200 B2 | 5/2006 | Schmid et al. |
| 8,112,280 B2 * | 2/2012 | Lu ............................ G10L 15/22 704/270 |

(Continued)

FOREIGN PATENT DOCUMENTS

WO            03030148 A1        4/2003

*Primary Examiner* — Martin Lerner
(74) *Attorney, Agent, or Firm* — Dinsmore & Shohl LLP

(57) ABSTRACT

Systems and vehicles that provide speech recognition system status notifications are described herein. Systems described herein include one or more processors, one or more memory modules, and machine readable instructions. In some embodiments described herein, when executed by the one or more processors, the machine readable instructions cause the speech recognition system to transform the acoustic vibrations received by a microphone into a speech input signal, determine to remotely process the speech input signal with a remote computing system, and provide a remote processing notification. In some embodiments described herein, when executed by the one or more processors, the machine readable instructions cause the speech recognition system to output an audible sequence with a speaker and provide a barge-in availability notification on a display.

13 Claims, 5 Drawing Sheets

(56) References Cited

U.S. PATENT DOCUMENTS

| | | | |
|---|---|---|---|
| 2002/0055844 A1* | 5/2002 | L'Esperance | H04M 1/271 704/260 |
| 2005/0267759 A1* | 12/2005 | Jeschke | G10L 15/22 704/270 |
| 2006/0009980 A1* | 1/2006 | Burke | G10L 15/32 704/270 |
| 2007/0213988 A1* | 9/2007 | Hanson | G06Q 10/06 704/275 |
| 2008/0104512 A1 | 5/2008 | Tarlton et al. | |
| 2009/0022286 A1* | 1/2009 | Brunson | H04L 12/58 379/88.12 |
| 2009/0125299 A1 | 5/2009 | Wang | |
| 2011/0246194 A1* | 10/2011 | Heins | G06F 3/165 704/235 |
| 2011/0264452 A1* | 10/2011 | Venkataramu | G10L 15/22 704/260 |
| 2012/0022853 A1* | 1/2012 | Ballinger | G10L 15/30 704/235 |
| 2012/0232892 A1* | 9/2012 | Goffin | G10L 15/22 704/231 |
| 2013/0132089 A1* | 5/2013 | Fanty | G10L 21/00 704/270 |
| 2013/0151250 A1* | 6/2013 | VanBlon | G10L 15/30 704/235 |
| 2015/0006147 A1* | 1/2015 | Schmidt | G10L 15/005 704/8 |
| 2015/0006165 A1* | 1/2015 | Schmidt | G10L 15/285 704/231 |
| 2015/0006182 A1* | 1/2015 | Schmidt | G10L 15/30 704/275 |

\* cited by examiner

SYSTEMS AND VEHICLES THAT PROVIDE SPEECH RECOGNITION SYSTEM NOTIFICATIONS

TECHNICAL FIELD

Embodiments described herein generally relate to speech recognition systems and, more specifically, to systems and vehicles that provide speech recognition system status notifications.

BACKGROUND

By way of background, speech recognition systems may receive and process speech input and perform a number of actions based on the speech input. Speech recognition systems may include a number of features accessible to a user of the speech recognition system. Various states of the speech recognition system may influence the way in which the user interacts with the system. For example, the system may take longer to respond to or process user commands in certain situations. Furthermore, not all features of the speech recognition system may be available at all times. Accordingly, it may be desirable for a speech recognition system to provide system status notifications to a user of the system, so that the user may understand when certain features are available and the factors that may be influencing system performance.

Accordingly, a need exists for providing speech recognition system notifications.

SUMMARY

In one embodiment, a speech recognition system includes one or more processors, one or more memory modules communicatively coupled to the one or more processors, a microphone communicatively coupled to the one or more processors, and machine readable instructions stored in the one or more memory modules. The microphone receives acoustic vibrations. When executed by the one or more processors, the machine readable instructions cause the speech recognition system to transform the acoustic vibrations received by the microphone into a speech input signal, determine to remotely process the speech input signal with a remote computing system, and provide a remote processing notification. The remote processing notification is indicative of the speech input signal being remotely processed with the remote computing system.

In another embodiment, a speech recognition system includes one or more processors, one or more memory modules communicatively coupled to the one or more processors, a microphone communicatively coupled to the one or more processors, a display communicatively coupled to the one or more processors, a speaker communicatively coupled to the one or more processors, and machine readable instructions stored in the one or more memory modules. The microphone receives acoustic vibrations. When executed by the one or more processors, the machine readable instructions cause the speech recognition system to output an audible sequence with the speaker and provide a barge-in availability notification on the display. The barge-in availability notification is indicative of an ability of the speech recognition system to process a speech input signal provided by the microphone before the speech recognition system has completed outputting the audible sequence.

In yet another embodiment, a vehicle includes one or more processors, one or more memory modules communicatively coupled to the one or more processors, a microphone communicatively coupled to the one or more processors, and machine readable instructions stored in the one or more memory modules. The microphone receives acoustic vibrations. When executed by the one or more processors, the machine readable instructions cause the vehicle to transform the acoustic vibrations received by the microphone into a speech input signal, determine to remotely process the speech input signal with a remote computing system, and provide a remote processing notification. The remote processing notification is indicative of the speech input signal being remotely processed with the remote computing system.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 4G schematically depicts a computer-generated insufficient speech volume icon shown on a portion of a display, according to one or more embodiments shown and described herein;

FIG. 4H schematically depicts a computer-generated excessive speech volume icon shown on a portion of a display, according to one or more embodiments shown and described herein;

DETAILED DESCRIPTION

The embodiments disclosed herein include systems and vehicles for providing speech recognition system notifications. Referring generally to the figures, embodiments of the systems and vehicles provided herein determine speech recognition system status information and provide notifications indicative of the status. Some embodiments described herein transform acoustic vibrations received by a microphone into a speech input signal, determine to remotely process the speech input signal with a remote computing system, and provide a remote processing notification indicative of the speech input signal being remotely processed with the remote computing system. Such remote processing notifications may allow a user of the system to understand that the speech recognition system is remotely processing the speech input, thereby allowing the user to understand potential variations in latency and recognition accuracy when compared to cases in which the system locally processes speech input. Some embodiments described herein output an audible sequence with the speaker and provide a barge-in availability notification on the display. The barge-in availability notification is indicative of an ability of the speech recognition system to process a speech input signal provided by the microphone before the speech recognition system has completed outputting the audible sequence. Such barge-in availability notifications may allow a user of the system to understand when the user may interrupt the system, thereby allowing the user to provide speech input to the system before the system has completed outputting audible information when such functionality is available, which may allow the user to more efficiently and quickly provide speech input to the system without being required to guess when the user may interrupt the system. The various systems and vehicles for providing speech recognition system notifications will be described in more detail herein with specific reference to the corresponding drawings.

Figure 1:
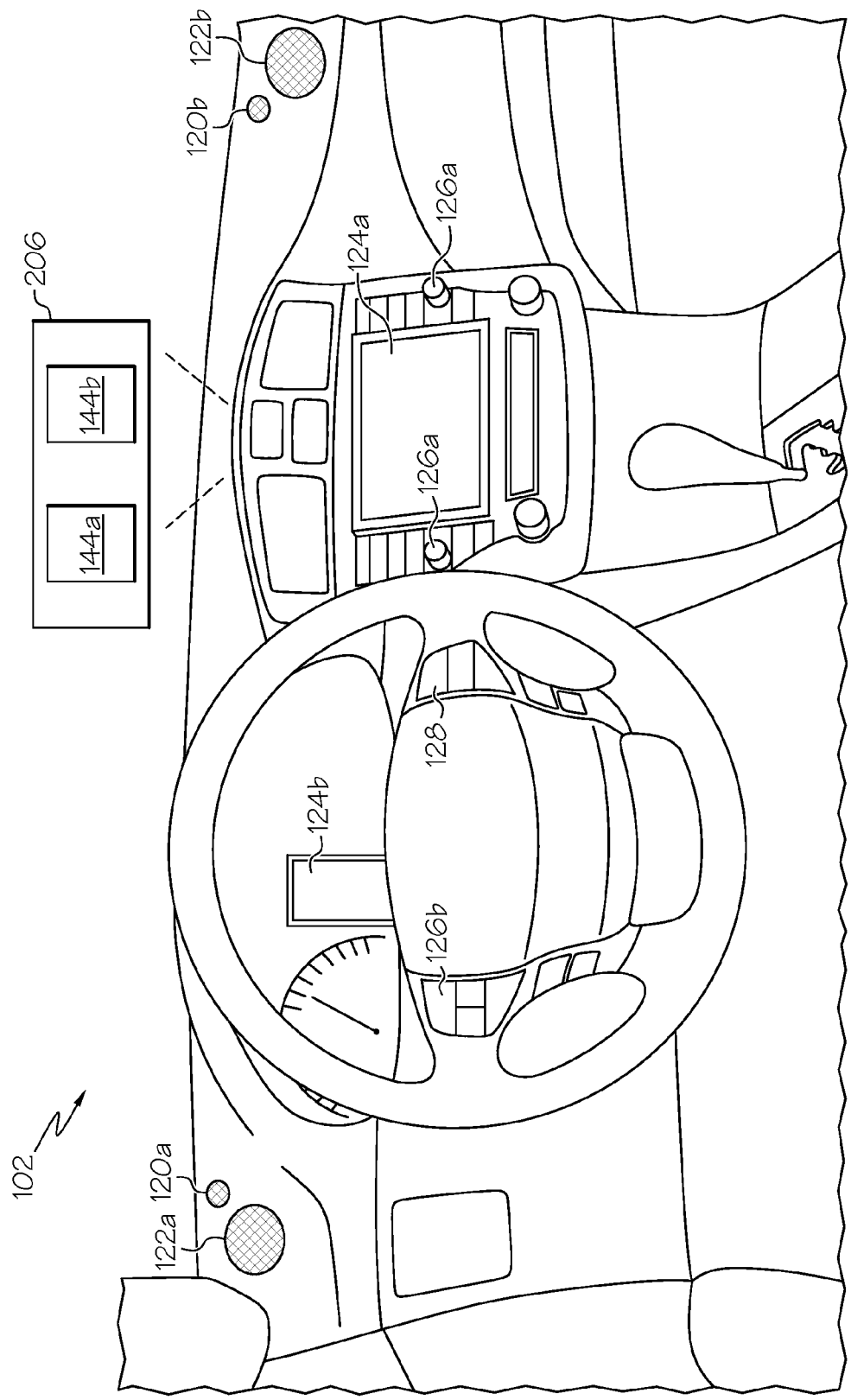
FIG. 1 schematically depicts an interior portion of a vehicle for providing speech recognition system status notifications, according to one or more embodiments shown and described herein.

Referring now to the drawings, FIG. 1 schematically depicts an interior portion of a vehicle 102 for providing speech recognition system status notifications, according to embodiments disclosed herein. As illustrated, the vehicle 102 may include a number of components that may provide input to or output from the speech recognition systems described herein. The interior portion of the vehicle 102 includes a console display 124a and a dash display 124b (referred to independently and/or collectively herein as "display 124"). The console display 124a may be configured to provide one or more user interfaces and may be configured as a touch screen and/or include other features for receiving user input. The dash display 124b may similarly be configured to provide one or more interfaces, but often the data provided in the dash display 124b is a subset of the data provided by the console display 124a. Regardless, at least a portion of the user interfaces depicted and described herein may be provided on either or both the console display 124a and the dash display 124b. The vehicle 102 also includes one or more microphones 120a, 120b (referred to independently and/or collectively herein as "microphone 120") and one or more speakers 122a, 122b (referred to independently and/or collectively herein as "speaker 122"). The one or more microphones 120a, 120b may be configured for receiving user voice commands and/or other inputs to the speech recognition systems described herein. Similarly, the speakers 122a, 122b may be utilized for providing audio content from the speech recognition system to the user. The microphone 120, the speaker 122, and/or related components may be part of an in-vehicle audio system. The vehicle 102 also includes tactile input hardware 126a and/or peripheral tactile input 126b for receiving tactile user input, as will be described in further detail below. The vehicle 102 also includes an activation switch 128 for providing an activation input to the speech recognition system, as will be described in further detail below.

The vehicle 102 may also include one or more memory modules 206, which may store local speech recognition logic 144a, and system notification generation logic 144b. The local speech recognition logic 144a and the system notification generation logic 144b may include a plurality of different pieces of logic, each of which may be embodied as a computer program, firmware, and/or hardware, as an example. The local speech recognition logic 144a may be configured to execute one or more local speech recognition algorithms on speech input received from the microphone 120, as will be described in further detail below. The system notification generation logic 144b may be configured to generate speech recognition system notifications, such as by causing imagery to be provided to the display 124 for display or causing audible sequences to be output by the speaker 122, as will be described in further detail below.

Figure 2:
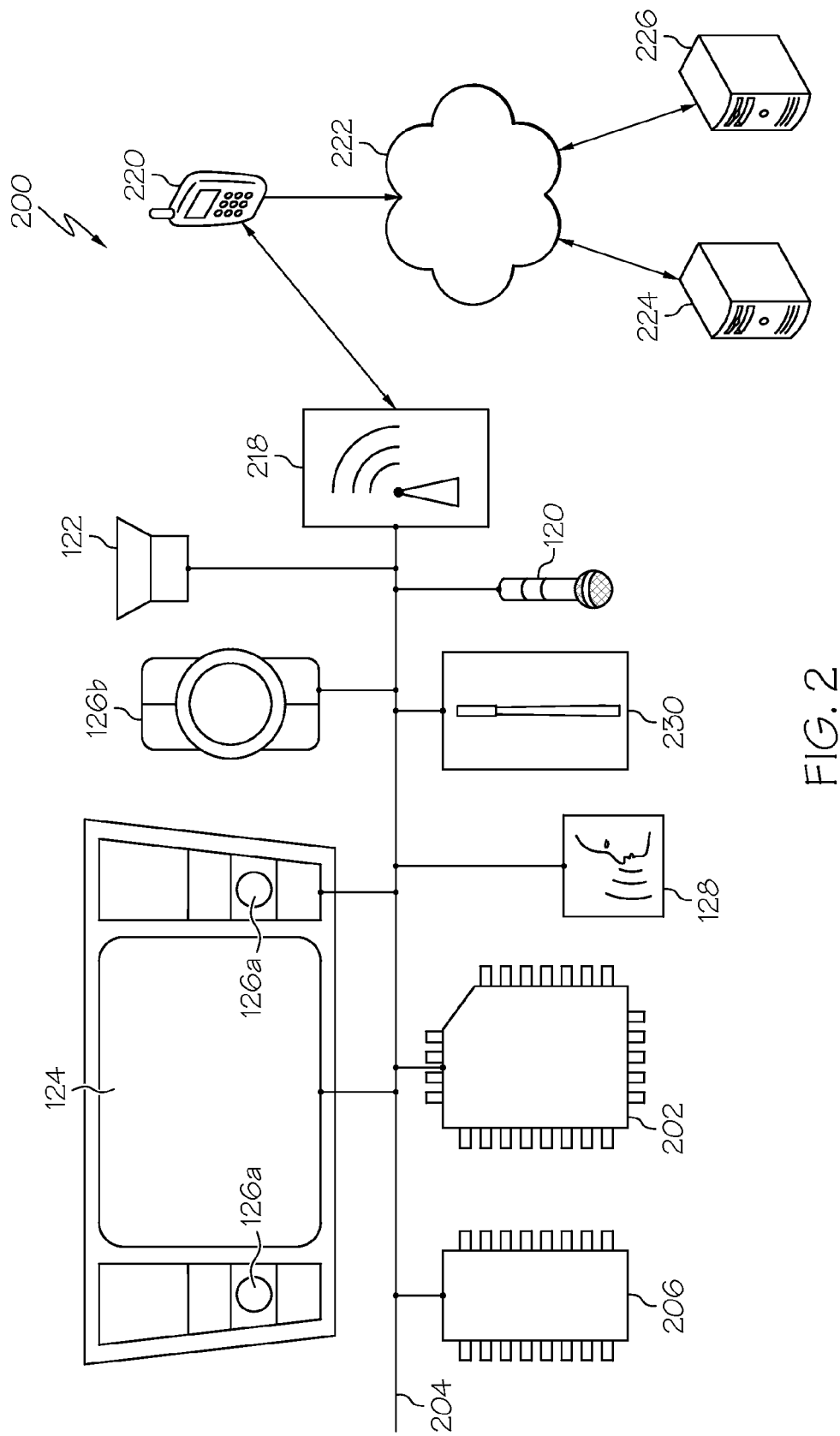
FIG. 2 schematically depicts a speech recognition system, according to one or more embodiments shown and described herein.

Referring now to FIG. 2, an embodiment of a speech recognition system 200, including a number of the components depicted in FIG. 1, is schematically depicted. It should be understood that the speech recognition system 200 may be integrated with the vehicle 102 or may be embedded within a mobile device (e.g., smartphone, laptop computer, etc.) carried by a driver of the vehicle.

The speech recognition system 200 includes one or more processors 202, a communication path 204, one or more memory modules 206, a display 124, a speaker 122, tactile input hardware 126a, a peripheral tactile input 126b, a microphone 120, an activation switch 128, network interface hardware 218, and a satellite antenna 230. The various components of the speech recognition system 200 and the interaction thereof will be described in detail below.

As noted above, the speech recognition system 200 includes the communication path 204. The communication path 204 may be formed from any medium that is capable of transmitting a signal such as, for example, conductive wires, conductive traces, optical waveguides, or the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 204 communicatively couples the various components of the speech recognition system 200. As used herein, the term "communicatively coupled" means that coupled components are capable of exchanging data signals with one another such as, for example, electrical signals via conductive medium, electromagnetic signals via air, optical signals via optical waveguides, and the like.

As noted above, the speech recognition system 200 includes the one or more processors 202. Each of the one or more processors 202 may be any device capable of executing machine readable instructions. Accordingly, each of the one or more processors 202 may be a controller, an integrated circuit, a microchip, a computer, or any other computing device. The one or more processors 202 are communicatively coupled to the other components of the speech recognition system 200 by the communication path 204. Accordingly, the communication path 204 may communicatively couple any number of processors with one another, and allow the modules coupled to the communication path 204 to operate in a distributed computing environment. Specifically, each of the modules may operate as a node that may send and/or receive data.

As noted above, the speech recognition system 200 includes the one or more memory modules 206. Each of the one or more memory modules 206 of the speech recognition system 200 is coupled to the communication path 204 and communicatively coupled to the one or more processors 202. The one or more memory modules 206 may comprise RAM, ROM, flash memories, hard drives, or any device capable of storing machine readable instructions such that the machine readable instructions can be accessed and executed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 206 may include one or more speech recognition algorithms, such as an automatic speech recognition engine that processes speech input signals received from the microphone 120 and/or extracts speech information from such signals, as will be described in further detail below. Furthermore, the one or more memory modules 206 include machine readable instructions that, when executed by the one or more processors 202, cause the speech recognition to perform the actions described below.

Still referring to FIG. 2, as noted above, the speech recognition system 200 comprises the display 124 for providing visual output such as, for example, information, entertainment, maps, navigation, information, or a combination thereof. The display 124 is coupled to the communication path 204 and communicatively coupled to the one or more processors 202. Accordingly, the communication path 204 communicatively couples the display 124 to other modules of the speech recognition system 200. The display 124 may include any medium capable of transmitting an optical output such as, for example, a cathode ray tube, light emitting diodes, a liquid crystal display, a plasma display, or the like. Moreover, the display 124 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 124 can include at least one of the one or more processors 202 and the one or memory modules 206. While the speech recognition system 200 includes a display 124 in the embodiment depicted in FIG. 2, the speech recognition system 200 may not include a display 124 in other embodiments, such as embodiments in which the speech recognition system 200 audibly provides outback or feedback via the speaker 122.

As noted above, the speech recognition system 200 comprises the speaker 122 for transforming data signals from the speech recognition system 200 into mechanical vibrations, such as in order to output audible prompts or audible information from the speech recognition system 200. The speaker 122 is coupled to the communication path 204 and communicatively coupled to the one or more processors 202. However, it should be understood that in other embodiments the speech recognition system 200 may not include the speaker 122, such as in embodiments in which the speech recognition system 200 does not output audible prompts or audible information, but instead visually provides output via the display 124.

Still referring to FIG. 2, as noted above, the speech recognition system 200 comprises tactile input hardware 126a coupled to the communication path 204 such that the communication path 204 communicatively couples the tactile input hardware 126a to other modules of the speech recognition system 200. The tactile input hardware 126a may be any device capable of transforming mechanical, optical, or electrical signals into a data signal capable of being transmitted with the communication path 204. Specifically, the tactile input hardware 126a may include any number of movable objects that each transform physical motion into a data signal that can be transmitted over the communication path 204 such as, for example, a button, a switch, a knob, a microphone or the like. In some embodiments, the display 124 and the tactile input hardware 126a are combined as a single module and operate as an audio head unit or an infotainment system. However, it is noted, that the display 124 and the tactile input hardware 126a may be separate from one another and operate as a single module by exchanging signals via the communication path 204. While the speech recognition system 200 includes tactile input hardware 126a in the embodiment depicted in FIG. 2, the speech recognition system 200 may not include tactile input hardware 126a in other embodiments, such as embodiments that do not include the display 124.

As noted above, the speech recognition system 200 optionally comprises the peripheral tactile input 126b coupled to the communication path 204 such that the communication path 204 communicatively couples the peripheral tactile input 126b to other modules of the speech recognition system 200. For example, in one embodiment, the peripheral tactile input 126b is located in a vehicle console to provide an additional location for receiving input. The peripheral tactile input 126b operates in a manner substantially similar to the tactile input hardware 126a, i.e., the peripheral tactile input 126b includes movable objects and transforms motion of the movable objects into a data signal that may be transmitted over the communication path 204.

As noted above, the speech recognition system 200 comprises the microphone 120 for transforming acoustic vibrations received by the microphone into a speech input signal. The microphone 120 is coupled to the communication path 204 and communicatively coupled to the one or more processors 202. As will be described in further detail below, the one or more processors 202 may process the speech input signals received from the microphone 120 and/or extract speech information from such signals.

Still referring to FIG. 2, as noted above, the speech recognition system 200 comprises the activation switch 128 for activating or interacting with the speech recognition system 200. In some embodiments, the activation switch 128 is an electrical switch that generates an activation signal when depressed, such as when the activation switch 128 is depressed by a user when the user desires to utilize or interact with the speech recognition system 200.

As noted above, the speech recognition system 200 includes the network interface hardware 218 for communicatively coupling the speech recognition system 200 with a mobile device 220 or a computer network. The network interface hardware 218 is coupled to the communication path 204 such that the communication path 204 communicatively couples the network interface hardware 218 to other modules of the speech recognition system 200. The network interface hardware 218 can be any device capable of transmitting and/or receiving data via a wireless network. Accordingly, the network interface hardware 218 can include a communication transceiver for sending and/or receiving data according to any wireless communication standard. For example, the network interface hardware 218 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 218 includes a Bluetooth transceiver that enables the speech recognition system 200 to exchange information with the mobile device 220 (e.g., a smartphone) via Bluetooth communication.

Still referring to FIG. 2, data from various applications running on the mobile device 220 may be provided from the mobile device 220 to the speech recognition system 200 via the network interface hardware 218. The mobile device 220 may be any device having hardware (e.g., chipsets, processors, memory, etc.) for communicatively coupling with the network interface hardware 218 and a cellular network 222. Specifically, the mobile device 220 may include an antenna for communicating over one or more of the wireless computer networks described above. Moreover, the mobile device 220 may include a mobile antenna for communicating with the cellular network 222. Accordingly, the mobile antenna may be configured to send and receive data according to a mobile telecommunication standard of any generation (e.g., 1G, 2G, 3G, 4G, 5G, etc.). Specific examples of the mobile device 220 include, but are not limited to, smart phones, tablet devices, e-readers, laptop computers, or the like.

The cellular network 222 generally includes a plurality of base stations that are configured to receive and transmit data according to mobile telecommunication standards. The base stations are further configured to receive and transmit data over wired systems such as public switched telephone network (PSTN) and backhaul networks. The cellular network 222 can further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Accordingly, the cellular network 222 can be utilized as a wireless access point by the mobile device 220 to access one or more servers (e.g., a first server 224 and/or a second server 226). The first server 224 and second server 226 generally include processors, memory, and chipset for delivering resources via the cellular network 222. Resources can include providing, for example, processing, storage, software, and information from the first server 224 and/or the second server 226 to the speech recognition system 200 via the cellular network 222. Additionally, it is noted that the first server 224 or the second server 226 can share resources with one another over the cellular network 222 such as, for example, via the wired portion of the network, the wireless portion of the network, or combinations thereof.

Still referring to FIG. 2, the one or more servers accessible by the speech recognition system 200 via the communication link of the mobile device 220 to the cellular network 222 may include third party servers that provide additional speech recognition capability. For example, the first server 224 and/or the second server 226 may include speech recognition algorithms capable of recognizing more words than the local speech recognition algorithms stored in the one or more memory modules 206. It should be understood that the mobile device 220 may be communicatively coupled to any number of servers by way of the cellular network 222.

As noted above, the speech recognition system 200 optionally includes a satellite antenna 230 coupled to the communication path 204 such that the communication path 204 communicatively couples the satellite antenna 230 to other modules of the speech recognition system 200. The satellite antenna 230 is configured to receive signals from global positioning system satellites. Specifically, in one embodiment, the satellite antenna 230 includes one or more conductive elements that interact with electromagnetic signals transmitted by global positioning system satellites. The received signal is transformed into a data signal indicative of the location (e.g., latitude and longitude) of the satellite antenna 230 or an object positioned near the satellite antenna 230, by the one or more processors 202. Additionally, it is noted that the satellite antenna 230 may include at least one of the one or more processors 202 and the one or memory modules 206. In embodiments where the speech recognition system 200 is coupled to a vehicle, the one or more processors 202 execute machine readable instructions to transform the global positioning satellite signals received by the satellite antenna 230 into data indicative of the current location of the vehicle. While the speech recognition system 200 includes the satellite antenna 230 in the embodiment depicted in FIG. 2, the speech recognition system 200 may not include the satellite antenna 230 in other embodiments, such as embodiments in which the speech recognition system 200 does not utilize global positioning satellite information or embodiments in which the speech recognition system 200 obtains global positioning satellite information from the mobile device 220 via the network interface hardware 218.

Still referring to FIG. 2, it should be understood that the speech recognition system 200 can be formed from a plurality of modular units, i.e., the display 124, the speaker 122, tactile input hardware 126a, the peripheral tactile input 126*b*, the microphone 120, the activation switch 128, etc. can be formed as modules that when communicatively coupled from the speech recognition system 200. Accordingly, in some embodiments, each of the modules can include at least one of the one or more processors 202 and/or the one or more memory modules 206. Accordingly, it is noted that, while specific modules may be described herein as including a processor and/or a memory module, the embodiments described herein can be implemented with the processors and memory modules distributed throughout various communicatively coupled modules.

Figure 3:
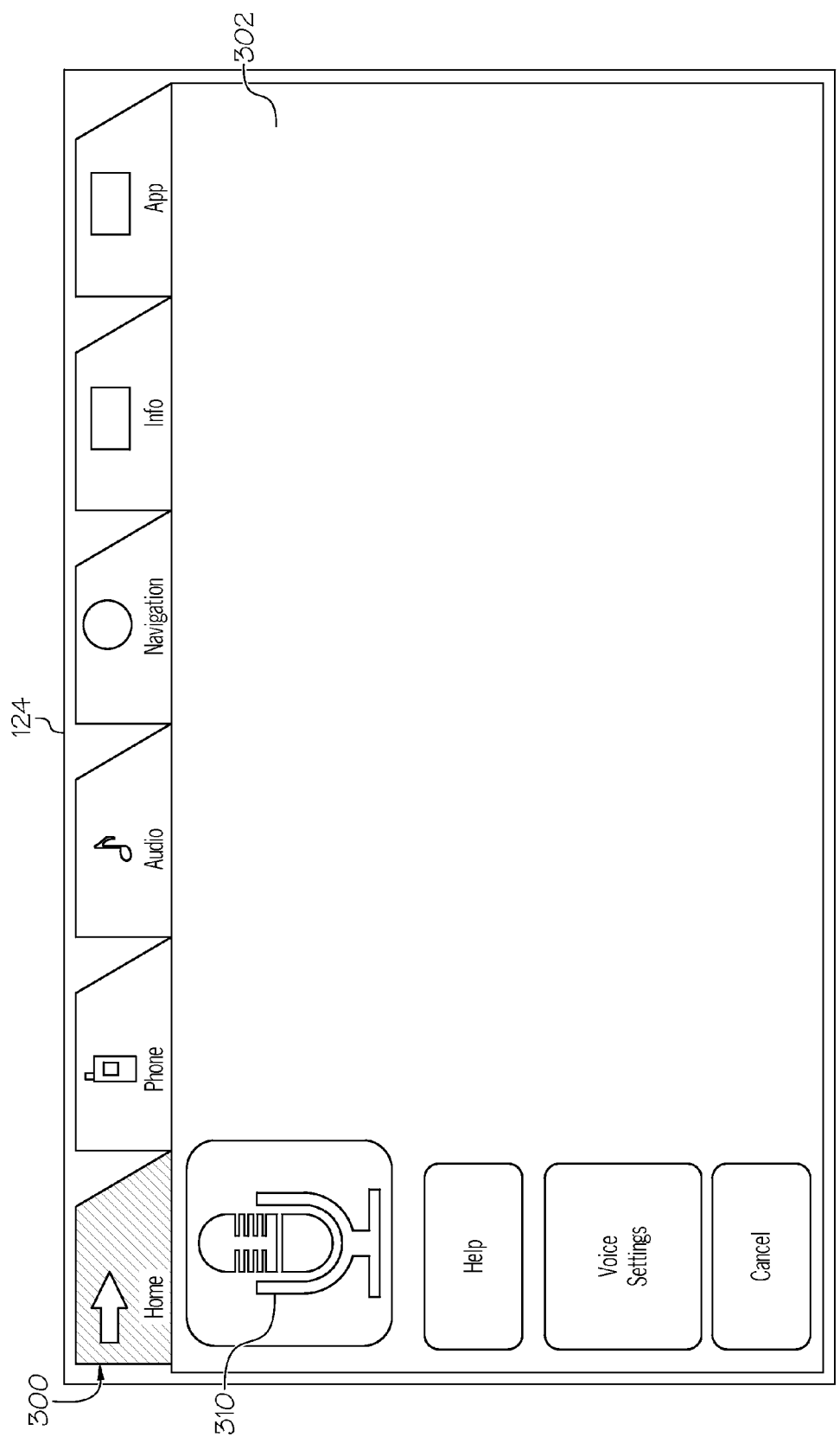
FIG. 3 schematically depicts a graphical user interface for displaying speech recognition system status notifications on a display, according to one or more embodiments shown and described herein.

Referring now to FIG. 3, an exemplary graphical user interface 300 for displaying speech recognition system status notifications as described herein is schematically depicted. The graphical user interface 300 is presented on the display 124. The graphical user interface may present information to a user of the system and allow the user to interact with the speech recognition system 200. The graphical user interface 300 depicted in FIG. 3 includes a content display portion 302, which may be used to present information to the user of the system. Furthermore, the graphical user interface 300 includes a system notification icon 310, which indicates the status of the speech recognition system 200. The system notification icon 310 changes appearance based on the current status of the speech recognition system 200, as will be described in further detail herein. Several embodiments of system notification icons are provided in FIGS. 4A-4I, each of which corresponds to a different system state, as will now be described with reference to a number of possible states of the speech recognition system 200.

1. System Pause Notification

The speech recognition system 200 may be in a paused state, such as when a user of the speech recognition system 200 indicates a desire to pause speech recognition functionality (e.g., by saying "pause," indicating a desire to pause by providing tactile input via the display 124, the tactile input hardware 126*a*, the peripheral tactile input 126*b*, or the like). In some embodiments, the speech recognition system 200 enters a paused state in response to receiving user input indicative of a desire to pause the speech recognition system 200. In other embodiments, the speech recognition system 200 may automatically enter a paused state based on one or more system events independent of user input indicative of a desire to pause the speech recognition system 200. Upon entering the paused state, the speech recognition system may provide a pause notification.

In some embodiments, the pause notification may be presented as a visual pause notification on the graphical user interface 300 of FIG. 3. For example, a computer-generated system pause icon 410, as shown on a portion of the display 124 in FIG. 4A, may be displayed as the system notification icon 310 of the graphical user interface 300 of FIG. 3 when the system is paused. The computer-generated system pause icon 410 is shown in FIG. 4A as a microphone that does not include a fill color, however it should be understood that in other embodiments the computer-generated system pause icon 410 may have an appearance other than that shown in FIG. 4A. Furthermore, it should be understood that the computer-generated system pause icon 410 may be displayed on any portion of the display 124.

In some embodiments, in addition to, or instead of, presenting the visual pause notification on the graphical user interface 300, the pause notification may be provided as an audible pause notification played by the speaker 122. The audible pause notification may be provided as a tone indicative of a paused system state or may be provided as computer-generated speech indicative of a paused system state, such as the word "pause."

2. Local Processing Notification

The speech recognition system 200 may be in a local processing state, such as when the speech recognition system 200 is locally processing speech input using the one or more processors 202. In some embodiments, the speech recognition system 200 enters a local processing state in response to receiving speech input to be processed by the one or more processors 202 by local speech recognition algorithms stored in the one or more memory modules 206. In some embodiments, the speech recognition system 200 may be in the local processing state for the duration between when the speech input is received and the speech input is completely processed by the one or more processors 202. Upon entering the local processing state, the speech recognition system 200 may provide a local processing notification.

In some embodiments, the local processing notification may be presented as a visual local processing notification on the graphical user interface 300 of FIG. 3. For example, a computer-generated local processing icon 420, as shown on a portion of the display 124 in FIG. 4B, may be displayed as the system notification icon 310 of the graphical user interface 300 of FIG. 3 when the system is locally processing speech input. The computer-generated local processing icon 420 shown in FIG. 4B includes a circular gear positioned proximate a microphone. However, it should be understood that in other embodiments the computer-generated local processing icon 420 may have an appearance other than that shown in FIG. 4B. Furthermore, it should be understood that the computer-generated local processing icon 420 may be displayed on any portion of the display 124.

In some embodiments, in addition to, or instead of, presenting the visual local processing notification on the graphical user interface 300, the local processing notification may be provided as an audible local processing notification played by the speaker 122. The audible local processing notification may be provided as a tone indicative of local processing or may be provided as computer-generated speech indicative of local processing.

3. System Busy Notification

The speech recognition system 200 may be in a busy state, such as such as when the user has pressed the activation switch 128, but the speech recognition system 200 is not yet ready to receive speech input. In some embodiments, the speech recognition system 200 enters the system busy state in response to receiving an activation input from the activation switch 128. In some embodiments, the speech recognition system 200 may be in the system busy state for the duration between when the system receives the activation input from the activation switch 128 until when the system is ready to receive speech input. Upon entering the system busy state, the speech recognition system 200 may provide a system busy notification, which may enable a user of the speech recognition system 200 to understand that the speech recognition system 200 is not yet ready to receive speech input, thereby avoiding the potential frustration of speaking a command before the system is able to receive the command.

In some embodiments, the system busy notification may be presented as a visual system busy notification on the graphical user interface 300 of FIG. 3. For example, a computer-generated system busy icon 430, as shown on a portion of the display 124 in FIG. 4C, may be displayed as the system notification icon 310 of the graphical user interface 300 of FIG. 3 when the system is busy. The computer-generated system busy icon 430 shown in FIG. 4C includes an hour glass positioned proximate a microphone. However, it should be understood that in other embodiments the computer-generated system busy icon 430 may have an appearance other than that shown in FIG. 4C. Furthermore, it should be understood that the computer-generated system busy icon 430 may be displayed on any portion of the display 124.

In some embodiments, in addition to, or instead of, presenting the visual system busy notification on the graphical user interface 300, the system busy notification may be provided as an audible system busy notification played by the speaker 122. The audible system busy notification may be provided as a tone indicative of a busy state or may be provided as computer-generated speech indicative of a busy state.

4. Remote Processing Notification

In some instances, the speech recognition system 200 may utilize a remote computing system to process a speech input signal. The speech recognition system 200 may determine to remotely process the speech input signal with a remote computing system for a number of reasons. For example, the speech recognition system may first locally process the speech input signal and determine that the speech input signal cannot be fully processed with the local speech recognition algorithm, in which case the speech recognition system determines to transmit the speech input signal to the remote computing system for processing. By way of another example, the speech recognition system 200 may locally process the speech input signal, determine a confidence level associated with processing the speech input signal with the local speech recognition algorithm, and determine to remotely process the speech input signal when the determined confidence level is below a threshold confidence level. In some embodiments, the speech recognition system may automatically transmit speech input to a remote computing system for processing, such as in embodiments in which the speech recognition system receives an activation signal from the activation switch 128, receives speech input from the microphone 120 in response to receiving the activation signal, and transmits the speech input to the remote computing system in response to receiving the activation input and the speech input. It should be understood that there are a variety of other instances in which the speech recognition system 200 may transmit the speech input signal to a remote computing system for processing, such as when the speech recognition system 200 determines that remote processing may be faster and/or more accurate than local processing.

Referring now to FIG. 2, in some embodiments in which the speech recognition system 200 utilizes a remote computing system to process a speech input signal, the speech recognition system 200 stores the speech input signal as a digital sound file (e.g., a *.wav, *.mp3, or any other type of compressed or uncompressed audio file format) in the one or more memory modules 206, transmits the digital sound file to the remote computing system, and receives processed speech information from the remote computing system. By way of non-limiting example, the speech recognition system 200 may transmit a digital sound file to the mobile device 220 via the network interface hardware 218, which may in turn transmit the digital sound file to the first server 224 or the second server 226 via the cellular network 222. The first server 224 or the second server 226 may process the digital sound file and transmit processed speech information to the mobile device 220 via the cellular network 222, which in turn transmits the processed speech information to the speech recognition system 200 via the network interface hardware 218.

When the speech recognition system 200 determines to remotely process speech input, the system may provide a remote processing notification, which may enable a user of the speech recognition system 200 to understand that the speech recognition system 200 is remotely processing the speech input, thereby allowing the user to understand potential variations in latency and recognition accuracy when compared to when the system locally processes speech input. In some embodiments, the remote processing notification may be presented as a visual remote processing notification on the graphical user interface 300 of FIG. 3. For example, a computer-generated remote processing icon 440, as shown on a portion of the display 124 in FIG. 4D, may be displayed as the system notification icon 310 of the graphical user interface 300 of FIG. 3 when the system is remotely processing speech input. In some embodiments, the computer-generated remote processing icon 440 may be displayed for the duration between when the system transmits the audio file to the remote processing system and when the system receives processed speech input. The computer-generated remote processing icon 440 shown in FIG. 4D includes a remote processing graphic (in this case, a circle with three emanating arcs) positioned proximate a microphone. However, it should be understood that in other embodiments the computer-generated remote processing icon 440 may have an appearance other than that shown in FIG. 4D. Furthermore, it should be understood that the computer-generated remote processing icon 440 may be displayed on any portion of the display 124.

In some embodiments, in addition to, or instead of, presenting the visual remote processing notification on the graphical user interface 300, the remote processing notification may be provided as an audible remote processing notification played by the speaker 122. The audible remote processing notification may be provided as a tone indicative of remote processing or may be provided as computer-generated speech indicative of remote processing.

5. Barge-In Availability Notification

In some embodiments, a barge-in function of the speech recognition system 200 may be available. The barge-in function allows a user to "interrupt" the speech recognition system 200 when the speech recognition system 200 is outputting an audible sequence (e.g., a prompt, requested information, etc.). The barge-in function allows the speech recognition system 200 to process a speech input signal provided by the microphone 120 before the speech recognition system 200 has completed outputting the audible sequence with the speaker 122.

Referring now to FIG. 2, in some embodiments in which a barge-in function is available, the speech recognition system 200 determines that the barge-in function is available using the one or more processors 202 (e.g., by determining that the speech recognition system 200 is currently outputting an audible sequence). Then, the speech recognition system 200 provides a barge-in availability notification, which may enable a user of the speech recognition system 200 to understand that speech input may be received before the speech recognition system 200 has completed outputting the audible sequence. In some embodiments, the barge-in availability notification may be presented as a visual barge-in availability notification on the graphical user interface 300 of FIG. 3. For example, a computer-generated barge-in availability icon 450, as shown on a portion of the display 124 in FIG. 4E, may be displayed as the system notification icon 310 of the graphical user interface 300 of FIG. 3 when the barge-in functionality is available. The computer-generated barge-in availability icon 450 shown in FIG. 4E includes a barge-in availability graphic (here, a speaker with emanating sound waves). However, it should be understood that in other embodiments the computer-generated barge-in availability icon 450 may have an appearance other than that shown in FIG. 4E. Furthermore, it should be understood that the computer-generated barge-in availability icon 450 may be displayed on any portion of the display 124. Accordingly, the barge-in availability notifications described herein may allow a user of the system to understand when the user may interrupt the system, thereby allowing the user to provide speech input to the system before the system has completed outputting an audible sequence when such functionality is available, which may allow the user to more efficiently and quickly provide speech input to the system without being required to guess when the user may interrupt the system.

In some embodiments, the speech recognition system 200 determines that the speech input signal is received before the speech recognition system has completed outputting the audible sequence and terminates the outputting of the audible sequence once a barge-in is detected.

6. Volume Notifications

The speech recognition system may also provide a notification indicative of the volume of the received speech input. For example, referring now to FIG. 4F, a computer-generated acceptable speech volume icon 460 is shown on a portion of the display 124. The computer-generated acceptable speech volume icon 460 may be displayed as the system notification icon 310 of the graphical user interface 300 of FIG. 3 when the system is receiving speech input at an acceptable volume level that is higher than a minimum threshold volume and lower than a maximum threshold volume. In the embodiment depicted in FIG. 4F, the computer-generated acceptable speech volume icon 460 is a microphone that fills vertically with a green (or any other) color area such that the height of the color area is proportional to a determined volume of received input. However, it should be understood that in other embodiments the computer-generated acceptable speech volume icon 460 may have an appearance other than that shown in FIG. 4F.

Referring now to FIG. 4G, a computer-generated insufficient speech volume icon 470 is shown on a portion of the display 124. The computer-generated insufficient speech volume icon 470 may be displayed as the system notification icon 310 of the graphical user interface 300 of FIG. 3 when the system is receiving speech input below a minimum threshold volume level at which the system will have difficulty accurately processing the received speech input. In the embodiment depicted in FIG. 4G, the computer-generated insufficient speech volume icon 470 is a microphone that fills vertically with a yellow (or any other) color area such that the height of the color area is proportional to a determined volume of received input, but the height of the color area is less than 25% of the height of the microphone to indicate that the volume of the speech input is too low. However it should be understood that in other embodiments the computer-generated insufficient speech volume icon 470 may have an appearance other than that shown in FIG. 4G.

Referring now to FIG. 4H, a computer-generated excessive speech volume icon 480 is shown on a portion of the display 124. The computer-generated excessive speech volume icon 480 may be displayed as the system notification icon 310 of the graphical user interface 300 of FIG. 3 when the system is receiving speech input above a maximum threshold volume level at which the system will have difficulty accurately processing the received speech input. In the embodiment depicted in FIG. 4H, the computer-generated excessive speech volume icon 480 is a microphone that fills vertically with a red (or any other) color area such that the height of the color area is proportional to a determined volume of received input, but the height of the color area is greater than 75% of the height of the microphone to indicate that the volume of the speech input is too high. However it should be understood that in other embodiments the computer-generated excessive speech volume icon 480 may have an appearance other than that shown in FIG. 4H.

Figure 4E:
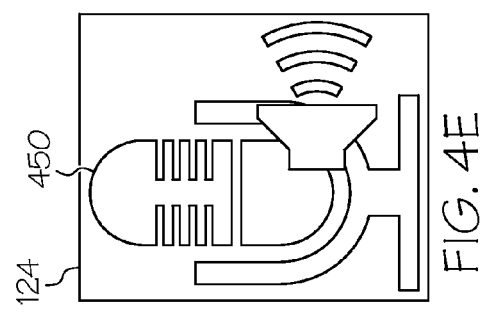
FIG. 4E schematically depicts a computer-generated barge-in availability icon shown on a portion of a display, according to one or more embodiments shown and described herein.
Figure 4D:
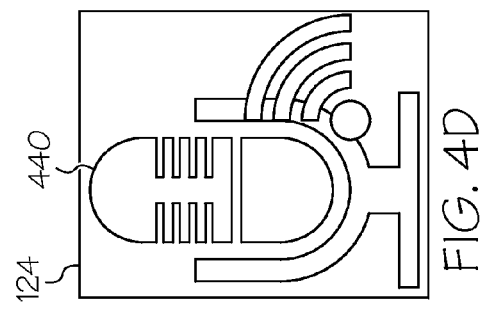
FIG. 4D schematically depicts a computer-generated remote processing icon for shown on a portion of a display, according to one or more embodiments shown and described herein.
Figure 4I:
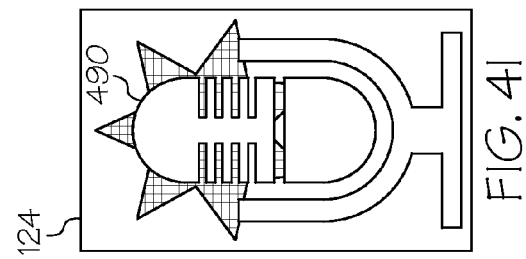
FIG. 4I schematically depicts a computer-generated noisy environment icon shown on a portion of a display, according to one or more embodiments shown and described herein.
Figure 4C:
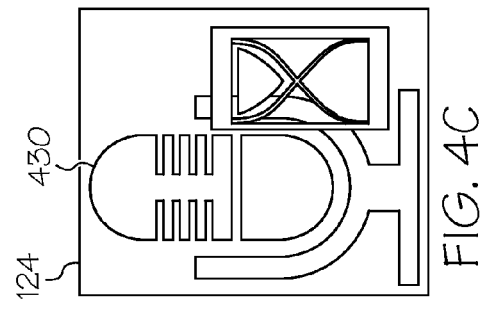
FIG. 4C schematically depicts a computer-generated system busy icon shown on a portion of a display, according to one or more embodiments shown and described herein.
Figure 4B:
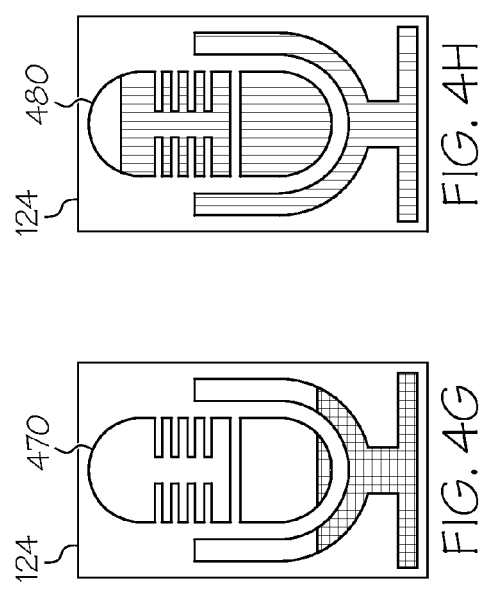
FIG. 4B schematically depicts a computer-generated system processing icon shown on a portion of a display, according to one or more embodiments shown and described herein.
Figure 4B:
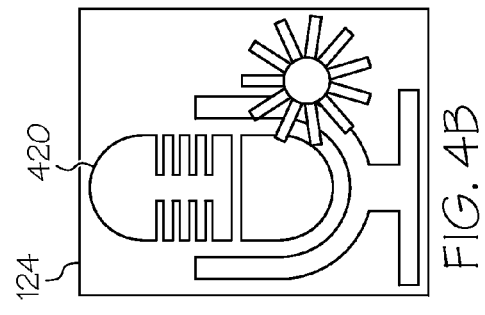
Figure 4A:
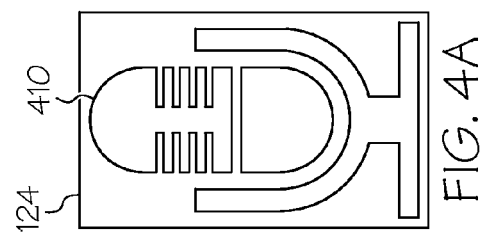
FIG. 4A schematically depicts a computer-generated system pause icon shown on a portion of a display, according to one or more embodiments shown and described herein.
Figure 4F:
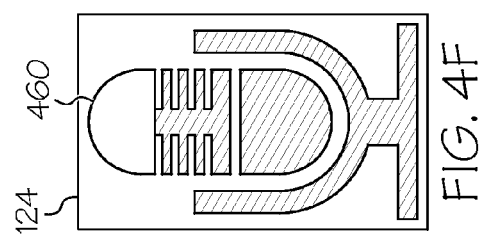
FIG. 4F schematically depicts a computer-generated acceptable speech volume icon shown on a portion of a display, according to one or more embodiments shown and described herein.

Referring now to FIG. 4I, a computer-generated noisy environment icon 490 is shown on a portion of the display 124. The computer-generated noisy environment icon 490 may be displayed as the system notification icon 310 of the graphical user interface 300 of FIG. 3 when the system detects that the ambient noise level is above a threshold noise level at which the system will have difficulty accurately processing the received speech input. The computer-generated noisy environment icon 490 shown in FIG. 4I includes a microphone filled with a yellow star behind the microphone. However, it should be understood that in other embodiments, the computer-generated noisy environment icon 490 may have an appearance other than that shown in FIG. 4I.

8. Additional Audible Notifications

In addition to the visual and audible notifications described above, the speech recognition system 200 may provide a number of additional audible notifications, such as: a "listening" tone indicative that the system is listening for voice input from the user (e.g., a beep or chirp after the system finishes outputting a voice guidance prompt); a "done" tone indicating that speech recognition has ended; a "confirmation" tone indicating that the system has received and is processing voice input; an "error" tone indicating that the system was not able to successfully process the voice input either because the request was not understood or it could not be fulfilled; and a "task transition" tone indicating that the system is not able to complete a task and is transitioning to a manual interface to complete the task.

Figure 5:
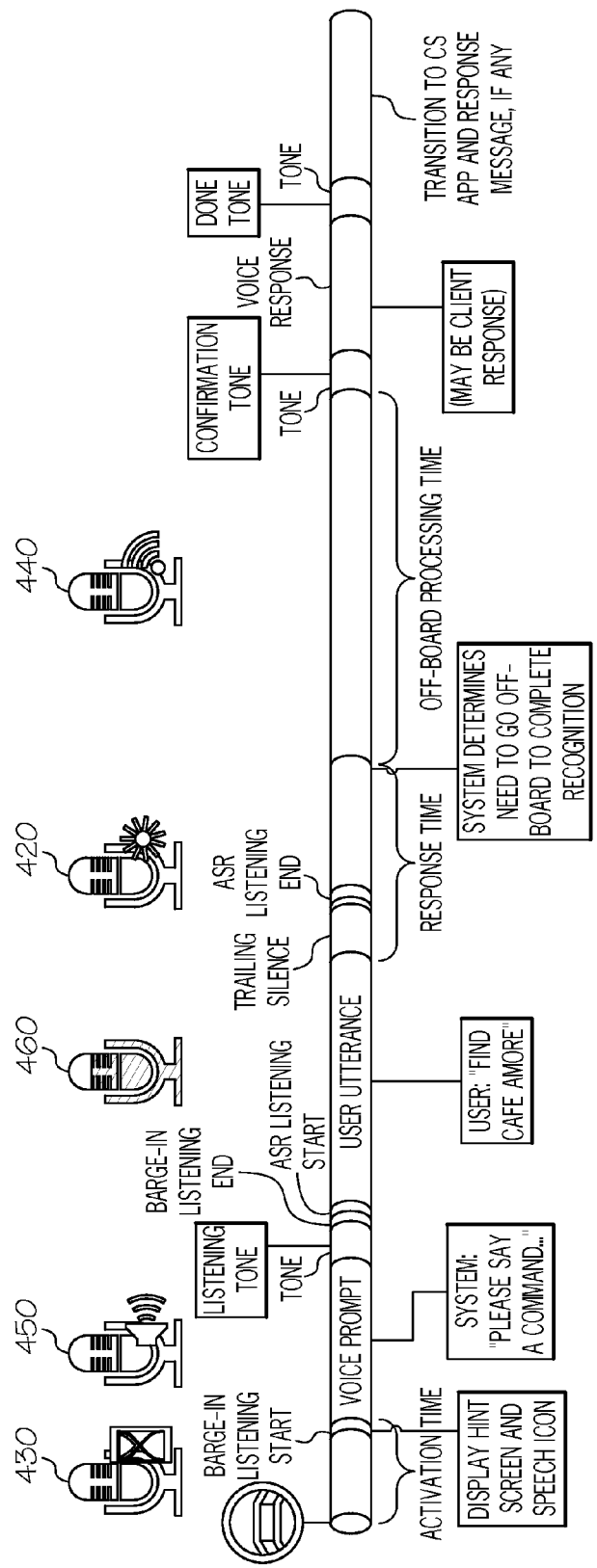
FIG. 5 schematically depicts an exemplary speech recognition system use case, according to one or more embodiments shown and described herein.

Referring now to FIG. 5, an exemplary use case of the speech recognition system 200 is schematically depicted. Beginning from the left of the system flow depicted, a user may activate the speech recognition system 200 by pressing the activation switch 128. Upon receiving an activation input generated by the activation switch 128, the speech recognition system 200 may display the computer-generated system busy icon 430 on the display 124 during an activation time to indicate that the speech recognition system 200 is not yet ready to accept speech input. Once the speech recognition system 200 is ready to receive speech input, the system may output a voice prompt (e.g., "Please say a command . . . ") with the speaker 122 while outputting the computer-generated barge-in availability icon 450 on the display 124 to indicate that the user may interrupt the system with a command before the system has completed outputting the voice prompt. After finishing outputting the voice prompt, the speech recognition system 200 may output a listening tone with the speaker 122 to indicate that the system is now listening for a user response to the voice prompt. After outputting the listening tone, the system may begin to start listening for user input from the microphone 120 while displaying a speech volume icon 460, the fill color and fill height of which is dependent on a volume of speech input received by the microphone 120. In the example depicted in FIG. 5, the user utters "Find Cafe Amore" to request that the system find the location associated with the "Cafe Amore"

point of interest. After receiving the "Find Cafe Amore" request, the system may process the request during a response time, during which the computer-generated local processing icon 420 is output on the display 124. The system may locally process the received speech input using local speech recognition algorithms stored in the one or more memory modules 206. After locally processing the speech input, the system may determine a need to remotely process the speech input, such as when the speech recognition system 200 was not able to confidently resolve the user command with the local speech recognition algorithms. Upon determining to remotely process the speech input to complete processing, the speech recognition system 200 may transmit the speech input to a remote computing system and output the computer-generated remote processing icon 440 on the display 124 to indicate to the user that the request is being processed remotely and that a longer delay may be expected. The speech recognition system 200 may receive processed speech input from the remote processing system and subsequently output a confirmation tone with the speaker 122. The system may transition to an application that may use the processed speech input, such as a navigation system, or the like.

In addition to the speech system status notifications described herein, the speech recognition system 200 may include other functionality, such as the ability to provide specific contextual speech recognition based on a system event or alert. For example, if the system receives a system event or alert, the system may automatically prepare for a certain type of user input that is dependent on the received system event or alert. For example, the system may alert the user to a received incoming text message or e-mail, the system may prepare to receive a response from the user to be sent to the sender of the received text message or e-mail, the user may press a switch on the steering wheel of a vehicle to activate the speech recognition system, the system may receive and process the speech input, and the system may automatically send a response to the sender of the received text message or e-mail without the need to specifically indicate the desire to send a response to the received text message or e-mail.

It should be understood that embodiments described herein provide for systems and vehicles for providing speech recognition system status notifications. The status notifications provided herein may alert a user of the speech recognition system to pertinent information regarding system operation. The remote processing status notifications described herein may allow a user of the system to understand that the speech recognition system is remotely processing the speech input, thereby allowing the user to understand potential variations in latency and recognition accuracy when compared to cases in which the system locally processes speech input. Furthermore, the barge-in availability notifications described herein may allow a user of the system to understand when the user may interrupt the system, thereby allowing the user to provide speech input to the system before the system has completed outputting audible information when such functionality is available, which may allow the user to more efficiently and quickly provide speech input to the system without being required to guess when the user may interrupt the system.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A speech recognition system comprising:
    one or more processors;
    one or more memory modules communicatively coupled to the one or more processors;
    a microphone communicatively coupled to the one or more processors, wherein the microphone receives acoustic vibrations;
    a speaker communicatively coupled to the one or more processors;
    a display communicatively coupled to the one or more processors; and
    machine readable instructions stored in the one or more memory modules that cause the speech recognition system to perform at least the following when executed by the one or more processors:
        transform the acoustic vibrations received by the microphone into a speech input signal;
        determine whether: (i) to locally process the speech input signal with the one or more processors of the speech recognition system, or (ii) to remotely process the speech input signal with a remote computing system;
        provide a local processing notification in response to determining to locally process the speech input signal with the one or more processors of the speech recognition system, wherein the local processing notification is indicative of the speech input signal being locally processed with the one or more processors of the speech recognition system;
        provide a remote processing notification in response to determining to remotely process the speech input signal with the remote computing system, wherein the remote processing notification is indicative of the speech input signal being remotely processed with the remote computing system;
        provide a pause notification in response to receiving a user input indicative of a desire to pause a speech recognition functionality, wherein the pause notification is indicative of the speech recognition system being in a paused state;
        output an audible sequence with the speaker;
        provide a barge-in availability notification on the display, wherein the barge-in availability notification is indicative of an ability of the speech recognition system to process the speech input signal provided by the microphone before the speaker has completed outputting the audible sequence;
        detect a barge-in by determining that the speech input signal is received by the speech recognition system before the speaker has completed outputting the audible sequence; and
        terminate the output of the audible sequence with the speaker in response to detecting the barge-in.

2. The speech recognition system of claim 1, wherein the machine readable instructions stored in the one or more memory modules cause the speech recognition system to perform at least the following when executed by the one or more processors:
    present a visual remote processing notification on the display in order to provide the remote processing notification, wherein the visual remote processing notification is indicative of the speech input signal being remotely processed with the remote computing system.

3. The speech recognition system of claim 2, wherein the visual remote processing notification is a remote processing icon.

4. The speech recognition system of claim 3, wherein the machine readable instructions stored in the one or more memory modules further cause the speech recognition system to perform at least the following when executed by the one or more processors:
present a microphone icon on the display, wherein the remote processing icon includes a remote processing graphic presented proximate to the microphone icon.

5. The speech recognition system of claim 1, wherein the machine readable instructions stored in the one or more memory modules cause the speech recognition system to perform at least the following when executed by the one or more processors:
generate an audible remote processing notification with the speaker in order to provide the remote processing notification, wherein the audible remote processing notification is indicative of the speech input signal being remotely processed with the remote computing system.

6. The speech recognition system of claim 1, wherein the machine readable instructions stored in the one or more memory modules further cause the speech recognition system to perform at least the following when executed by the one or more processors:
process the speech input signal with a local speech recognition algorithm; and
determine that the speech input signal cannot be fully processed with the local speech recognition algorithm, wherein the speech recognition system determines to remotely process the speech input signal when the speech input signal cannot be fully processed by the local speech recognition algorithm.

7. The speech recognition system of claim 1, wherein the machine readable instructions stored in the one or more memory modules further cause the speech recognition system to perform at least the following when executed by the one or more processors:
process the speech input signal with a local speech recognition algorithm; and
determine a confidence level associated with processing the speech input signal with the local speech recognition algorithm, wherein the speech recognition system determines to remotely process the speech input signal when the confidence level is below a threshold confidence level.

8. The speech recognition system of claim 1, wherein the machine readable instructions stored in the one or more memory modules further cause the speech recognition system to perform at least the following when executed by the one or more processors:
store the speech input signal as a digital sound file in the one or more memory modules;
transmit the digital sound file to the remote computing system; and
receive processed speech information from the remote computing system.

9. The speech recognition system of claim 1, further comprising an activation switch communicatively coupled to the one or more processors, wherein the machine readable instructions stored in the one or more memory modules cause the speech recognition system to perform at least the following when executed by the one or more processors:
receive a speech recognition activation signal from the activation switch, wherein the speech recognition system determines to remotely process the speech input signal with the remote computing system in response to receiving the speech recognition activation signal.

10. A speech recognition system comprising:
one or more processors;
one or more memory modules communicatively coupled to the one or more processors;
a microphone communicatively coupled to the one or more processors, wherein the microphone receives acoustic vibrations;
a display communicatively coupled to the one or more processors;
a speaker communicatively coupled to the one or more processors; and
machine readable instructions stored in the one or more memory modules that cause the speech recognition system to perform at least the following when executed by the one or more processors:
transform the acoustic vibrations received by the microphone into a speech input signal;
determine whether: (i) to locally process the speech input signal with the one or more processors of the speech recognition system, or (ii) to remotely process the speech input signal with a remote computing system;
provide a local processing notification in response to determining to locally process the speech input signal with the one or more processors of the speech recognition system, wherein the local processing notification is indicative of the speech input signal being locally processed with the one or more processors of the speech recognition system;
provide a remote processing notification in response to determining to remotely process the speech input signal with the remote computing system, wherein the remote processing notification is indicative of the speech input signal being remotely processed with the remote computing system;
output an audible sequence with the speaker;
provide a barge-in availability notification on the display, wherein the barge-in availability notification is indicative of an ability of the speech recognition system to process the speech input signal provided by the microphone before the speaker has completed outputting the audible sequence;
detect a barge-in by determining that the speech input signal is received by the speech recognition system before the speaker has completed outputting the audible sequence; and
terminate the output of the audible sequence with the speaker in response to detecting the barge-in.

11. The speech recognition system of claim 10, wherein the barge-in availability notification is a barge-in availability icon.

12. The speech recognition system of claim 11, wherein the machine readable instructions stored in the one or more memory modules further cause the speech recognition system to perform at least the following when executed by the one or more processors:
present a microphone icon on the display, wherein the barge-in availability icon includes a barge-in availability graphic presented proximate to the microphone icon.

13. The speech recognition system of claim 10, wherein the machine readable instructions stored in the one or more memory modules further cause the speech recognition system to perform at least the following when executed by the one or more processors:
provide a pause notification in response to receiving a user input indicative of a desire to pause a speech recognition functionality, wherein the pause notification is indicative of the speech recognition system being in a paused state.

* * * * *